Figure 3:
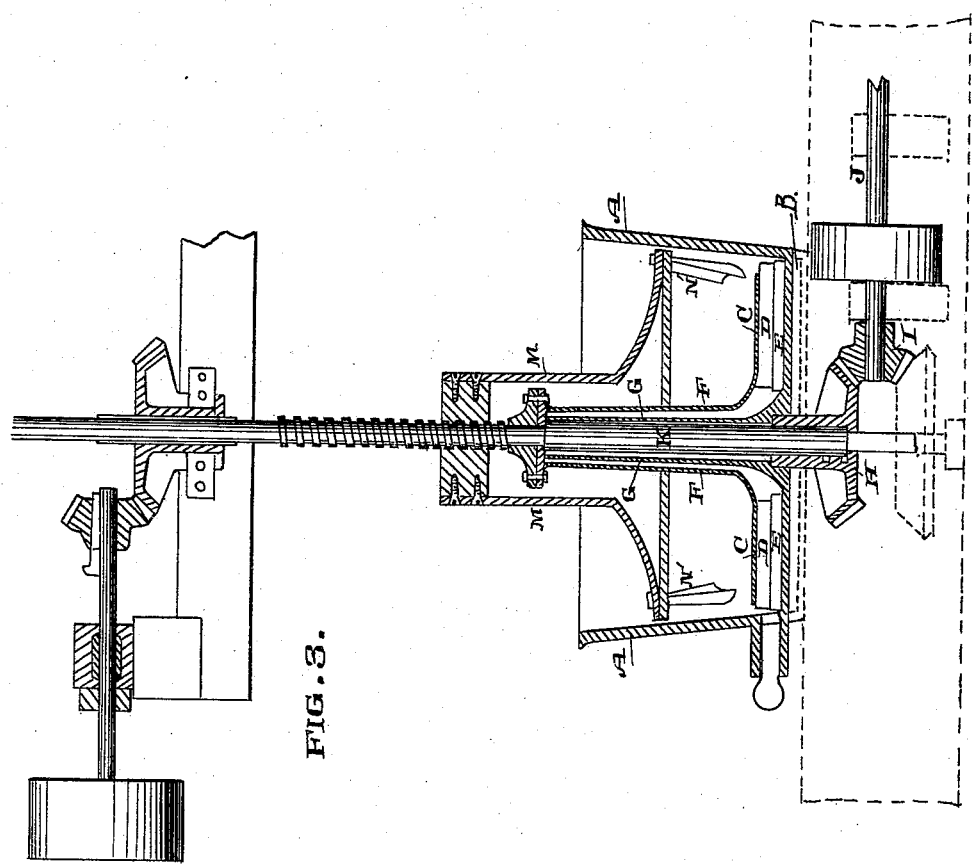

(No Model.) 2 Sheets—Sheet 1.
A. SODERLING.
AMALGAMATING PAN.
No. 375,212. Patented Dec. 20, 1887.
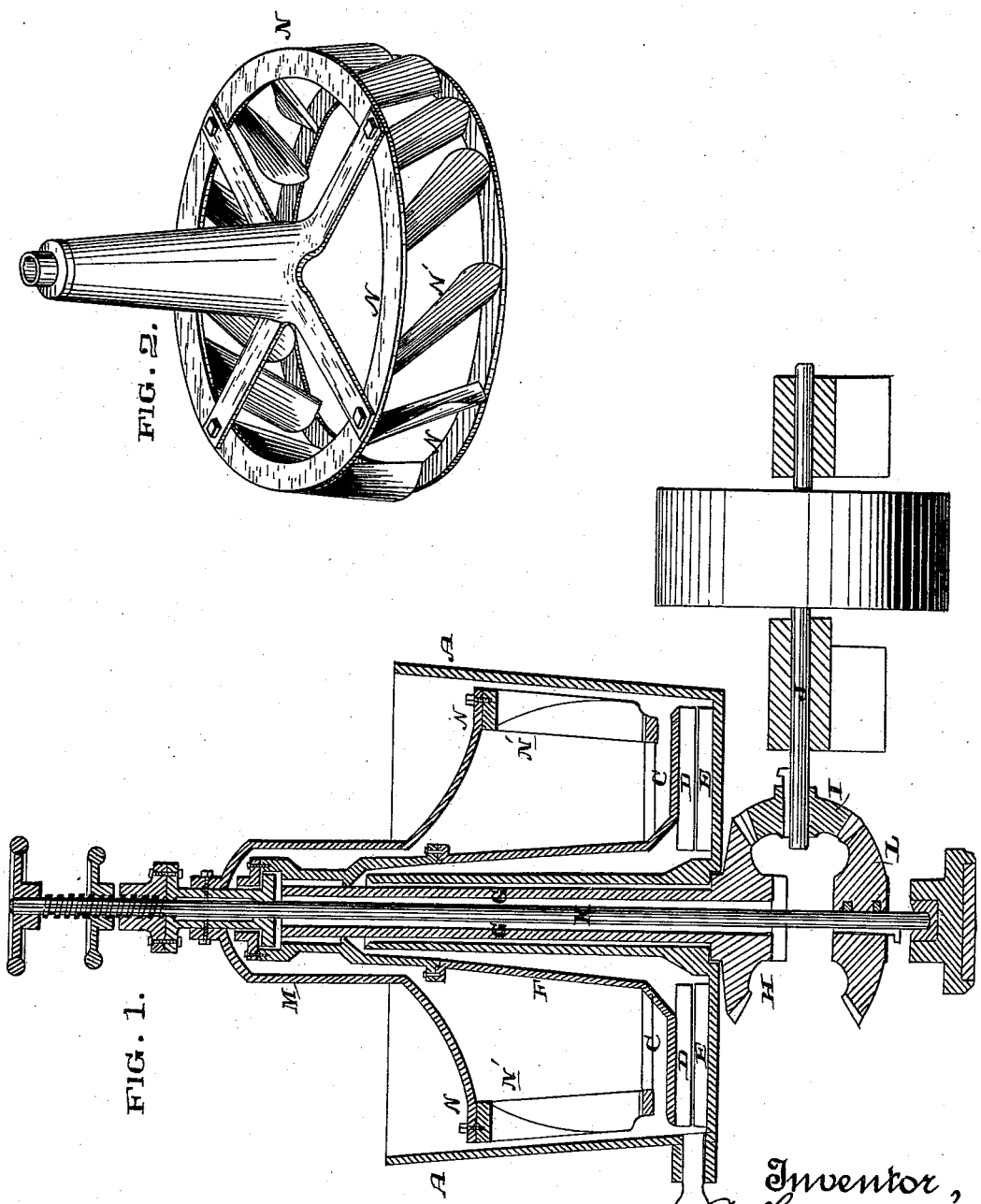
Witnesses,
Geo. H. Strong,
J. H. Towne.
Inventor,
A. Soderling
By Dewey & Co.
Atty.

(No Model.) 2 Sheets—Sheet 2.

A. SODERLING.
AMALGAMATING PAN.

No. 375,212. Patented Dec. 20, 1887.

Witnesses,
Geo. H. Strong.
J. H. Rouse.

Inventor,
A. Soderling
By Dewey & Co.
Attys

UNITED STATES PATENT OFFICE.

AUGUST SODERLING, OF BODIE, CALIFORNIA.

AMALGAMATING-PAN.

SPECIFICATION forming part of Letters Patent No. 375,212, dated December 20, 1887.

Application filed December 22, 1886. Serial No. 222,326. (No model.)

*To all whom it may concern:*

Be it known that I, AUGUST SODERLING, of Bodie, Mono county, State of California, have invented an Improvement in Amalgamating-Pans; and I hereby declare the following to be a full, clear, and exact description of the same.

My invention relates to certain improvements in pans for amalgamating the precious metals of ores, sand, slimes, or tailings; and it has for its object the production of reverse currents within the pan which shall cause the harder and softer particles of the slimes or pulp within the pan to erode and disintegrate themselves by their action upon each other.

It consists of a pan having ordinary dies and a muller, which is caused to rotate in one direction by suitable mechanism, and in connection with this of an independent slotted isolated ring, which is driven in the opposite direction, so that centripetal and centrifugal lateral currents are produced, which come in contact with each other.

Referring to the accompanying drawings for a more complete explanation of my invention, Figure 1 is a vertical section of the pan, showing my invention. Fig. 2 is a perspective view of the slotted ring. Fig. 3 shows the device with the ring driven from above.

In the ordinary construction of amalgamating-pans it is customary to grind the material which is placed in the pan by means of a muller or mullers rotating above dies fixed in the bottom of the pan, and between which and the muller the material is caused to pass, so that the two opposing surfaces will grind and reduce it as much as desired in the presence of mercury or chemicals, which assist in saving the valuable metallic portion. This action is not perfect or by any means complete, and I have discovered that by the production of the counter-currents I am enabled to cause the material itself to act as a grinder upon the other parts of the material, and thus very materially increase the yield of precious metal.

A is a pan having a steam-bottom, B, and a muller, C, with grinding-shoes D.

E are the dies which are placed in the bottom of the pan and between which and the shoes of the muller the material is caused to pass by the centrifugal motion of the muller from the inner portion of the pan to the outer. This muller has a yoke or cone extending upward, as shown at F, above the central cone of the pan, and it is driven by means of a hollow shaft, G, which extends up through the central cone of the pan and has a feather or key by which it is connected with the muller, so that the two will move together. This hollow shaft is driven by means of a beveled gear-wheel, H, which is engaged by a pinion, I, upon the horizontal shaft J, to which power is applied by an exterior pulley or by other suitable means.

K is a shaft which extends up through the hollow shaft G, before described, and it has a gear-wheel, L, fixed upon it so as to engage the driving-pinion I upon the opposite side from the gear-wheel H, this one pinion serving to drive the shafts G and K in opposite directions.

The upper end of the shaft K has a feather which engages with a corresponding keyway in the hub at the upper end of the cone M. This cone extends down outside of the inner one, F, which connects with the muller C, before described, corresponding with it in shape, and it is connected with a stirring device which is driven by it in an opposite direction from that of the muller. This stirring device comprises the rings N, having fitted thereto angular blades N', thereby forming slots between said blades, said slots being angular, as shown, and having their sides curved, so that when rotating the tendency will be to carry the material from the outside of the pan through the slots and throw it toward the center, where it will come in contact with the oppositely-moving current, which is thrown outward by the inner muller moving in the opposite direction. This action produced by the independent currents forms a circulating current above and below the mullers and causes the harder and softer portions composing the pulp or slime to erode and disintegrate each other, thus releasing any precious metals which may be still contained therein, and also mercury which has become floured by grinding, and the whole mass of material will be acted upon by the chemicals employed during the process and will be amalgamated with the mercury which is placed in the pan for the purpose.

The pan, with the steam-bottom, dies, the muller, and driving-gear, will be similar to those used in the ordinary grinding-pans; but the isolated ring rotating in the opposite direction from the muller and without contact with it or any other portion of the pan produces an action very much greater than can be accomplished by any amount of grinding, the time being no greater than that occupied with the ordinary grinding, and the amount of power required being only that necessary to run this isolated ring, which may be made to run either faster or slower than the grinding-muller by a simple change in the relative sizes of the gear-wheels H and L.

My experiments show that with an ordinary muller-pan, slimes without the addition of sand will yield only about fifteen per cent. of the precious metals contained in them; but by the addition of the isolated slotted ring the yield increases to about seventy per cent. By the use of this device I avoid friction, which would be necessary if more grinding-surfaces were employed, and the excessive wear of the machinery, and the effective action is much greater, inasmuch as the striking-points of the opposing currents are acting all the way around the pan and so far from the center as to be in operation about one-third the radius of the pan from the edge.

I am enabled by this device to increase the size of the pans without greater cost of labor and repairs, and but slight additional fuel and power necessary to drive them, and by this greater economy I am enabled to work slimes, sand, ores, or tailings of a lower grade than can be done by ordinary amalgamation.

It will be manifest that the independent ring may be driven by gearing from above, as shown in Fig. 3.

Amalgamated plates may be fixed in the slots of the independent ring to facilitate the saving of the valuable metals.

Having thus described my invention, what I claim as new, and desire to secure by Letters Patent, is—

1. An amalgamator consisting of a pan having fixed shoes in the bottom thereof, a muller having a grinding face or faces, and a shaft and gearing for rotating the same, in combination with a stirring device comprising an isolated ring supported above the muller, said ring having angular blades which are curved and extend upwardly, and a shaft and gear-wheels for rotating the ring in an opposite direction from that of the muller, substantially as herein described.

2. An amalgamator provided with a grinding-muller having mechanism by which it is driven in one direction within the pan, in combination with a ring having its vertical sides formed with angular blades, and mechanism connected with said ring by which it is driven in the opposite direction from the muller, substantially as herein described.

3. In an amalgamating-pan provided with a muller, a hollow driving-shaft having a beveled gear fixed to it, in combination with an isolated slotted ring connected with a central shaft extending through the hollow one which drives the muller and having a gear-wheel secured to it, and a single driving-pinion which engages the gear of the muller and the gear of the ring, so as to drive the muller and the ring in opposite directions, substantially as herein described.

4. In combination with an amalgamating-pan, the shaft and gear rotating said muller in one direction, a slotted ring, and a shaft and gear for rotating the ring in an opposite direction, whereby oppositely-moving currents are produced within the pan, substantially as described.

5. In combination with an amalgamating-pan, a muller, a shaft and gearing for rotating the same, and an independent stirring device comprising a slotted ring above the muller, a shaft and gear for rotating said ring in an opposite direction from the muller, said ring having amalgamated surfaces or plates forming blades within the slots, substantially as herein described.

In witness whereof I have hereunto set my hand.

AUGUST SODERLING.

Witnesses:
J. M. CUNNARD,
B. N. GRONANDER.